US007953883B2

(12) United States Patent
Thomas et al.

(10) Patent No.: US 7,953,883 B2
(45) Date of Patent: May 31, 2011

(54) FAILOVER MECHANISM FOR REAL-TIME PACKET STREAMING SESSIONS

(75) Inventors: Anil Thomas, Milpitas, CA (US); Dipak Punnoran Koroth, San Jose, CA (US); Mahesh Chakravarthy Vittal Viveganandhan, Sunnyvale, CA (US); Jiang Zhu, Stanford, CA (US)

(73) Assignee: Cisco Technology, Inc., San Jose, CA (US)

( * ) Notice: Subject to any disclaimer, the term of this patent is extended or adjusted under 35 U.S.C. 154(b) by 225 days.

(21) Appl. No.: 12/360,248

(22) Filed: Jan. 27, 2009

(65) Prior Publication Data
US 2010/0191858 A1      Jul. 29, 2010

(51) Int. Cl.
*G06F 15/16* (2006.01)
(52) U.S. Cl. ....................................................... 709/231
(58) Field of Classification Search .................. 709/227, 709/228; 379/202.01
See application file for complete search history.

(56) References Cited

U.S. PATENT DOCUMENTS
2005/0091190 A1 * 4/2005 Klemets ............................ 707/1
2006/0248212 A1 * 11/2006 Sherer et al. .................. 709/231

* cited by examiner

*Primary Examiner* — Frantz B Jean
(74) *Attorney, Agent, or Firm* — Edell, Shapiro & Finnan, LLC

(57) ABSTRACT

Techniques are provided herein for failover streaming mechanisms. At a first device (e.g., a content router device) that is configured to interface with a plurality of streaming servers for real-time protocol packet streams, communications are configured with a client device and a first of the plurality of streaming servers associated with a streaming session from the first streaming server to the client device so that the first device receives client session control and session feedback messages associated with the streaming session and so that a packet stream associated with the streaming session transmitted by the first streaming server to the client device does not pass through the first device. The first device stores session state information comprising an address of the client device, streaming session identification information and data representing a current state of the streaming session at the client device derived from the client session control and session feedback messages. Upon detecting a failure of the first streaming server, the first device selects a second of the plurality of streaming servers for serving the streaming session previously served by the first streaming server, and then initiates a streaming session from the second streaming server to the client device in order to continue from a state of the streaming session previously served by the first streaming server prior to the failure without any indication at the client device of the switching from the first streaming server to the second streaming server.

28 Claims, 9 Drawing Sheets

Receive from content router first random number to be used as initial RTP timestamp and second random number to be used as the RTP sequence number — 252

Begin streaming to client device using the first random number as the initial RTP timestamp and the second random number as the RTP sequence number, thereby serving as an arbitrary reference point known to content router for the session — 254

US 7,953,883 B2

FAILOVER MECHANISM FOR REAL-TIME PACKET STREAMING SESSIONS

TECHNICAL FIELD

The present disclosure relates to content distribution networks and techniques for maintaining real-time packet streams to devices in the event of streaming server failure.

BACKGROUND

In a content delivery network (CDN), such as Internet Protocol Television (IPTV) networks, content to be transmitted to an end user device (also called a client device herein) may be transmitted using the Real-Time Transport Protocol (RTP) communication standard. A computing apparatus called a streaming server transmits an RTP stream of packets to a client device as part of a streaming session for certain content (audio, video, etc.) requested by the client device.

From time to time, a streaming server may fail due to hardware or software errors. Streaming server failure causes interruption of service to all the client devices that the streaming server was serving to prior to the failure. Even when other streaming servers with access to "mirrored" content are available, current failover techniques require that an end-user at the client device initiate a new streaming session and then seek to the point at which the original session was interrupted. Thus, user intervention is required to restore the original session.

It is desirable to provide a scheme for responding to a streaming server failure in a manner that is transparent to the client devices and does not require user intervention or initiation.

BRIEF DESCRIPTION OF THE DRAWINGS

FIG. 8 is an example of a flow chart for stream timestamp and sequence adjustment logic in a streaming server.

DESCRIPTION OF EXAMPLE EMBODIMENTS

Overview

Techniques are provided herein for failover streaming mechanisms. At a first device (e.g., a content router device) that is configured to interface with a plurality of streaming servers for real-time protocol packet streams, communications are configured with a client device and a first of the plurality of streaming servers associated with a streaming session from the first streaming server to the client device so that the first device receives client session control and session feedback messages associated with the streaming session and so that a packet stream associated with the streaming session transmitted by the first streaming server to the client device does not pass through the first device. The first device stores session state information comprising an address of the client device, streaming session identification information and data representing a current state of the streaming session at the client device derived from the client session control and session feedback messages. Upon detecting a failure of the first streaming server, the first device selects a second of the plurality of streaming servers for serving the streaming session previously served by the first streaming server, and then initiates a streaming session from the second streaming server to the client device in order to continue from a state of the streaming session previously served by the first streaming server prior to the failure without any indication at the client device of the switching from the first streaming server to the second streaming server. These techniques are particularly useful in connection with streaming protocols that use timestamps and sequence numbers in order to maintain their continuity in a real-time stream of data.

Figure 1:
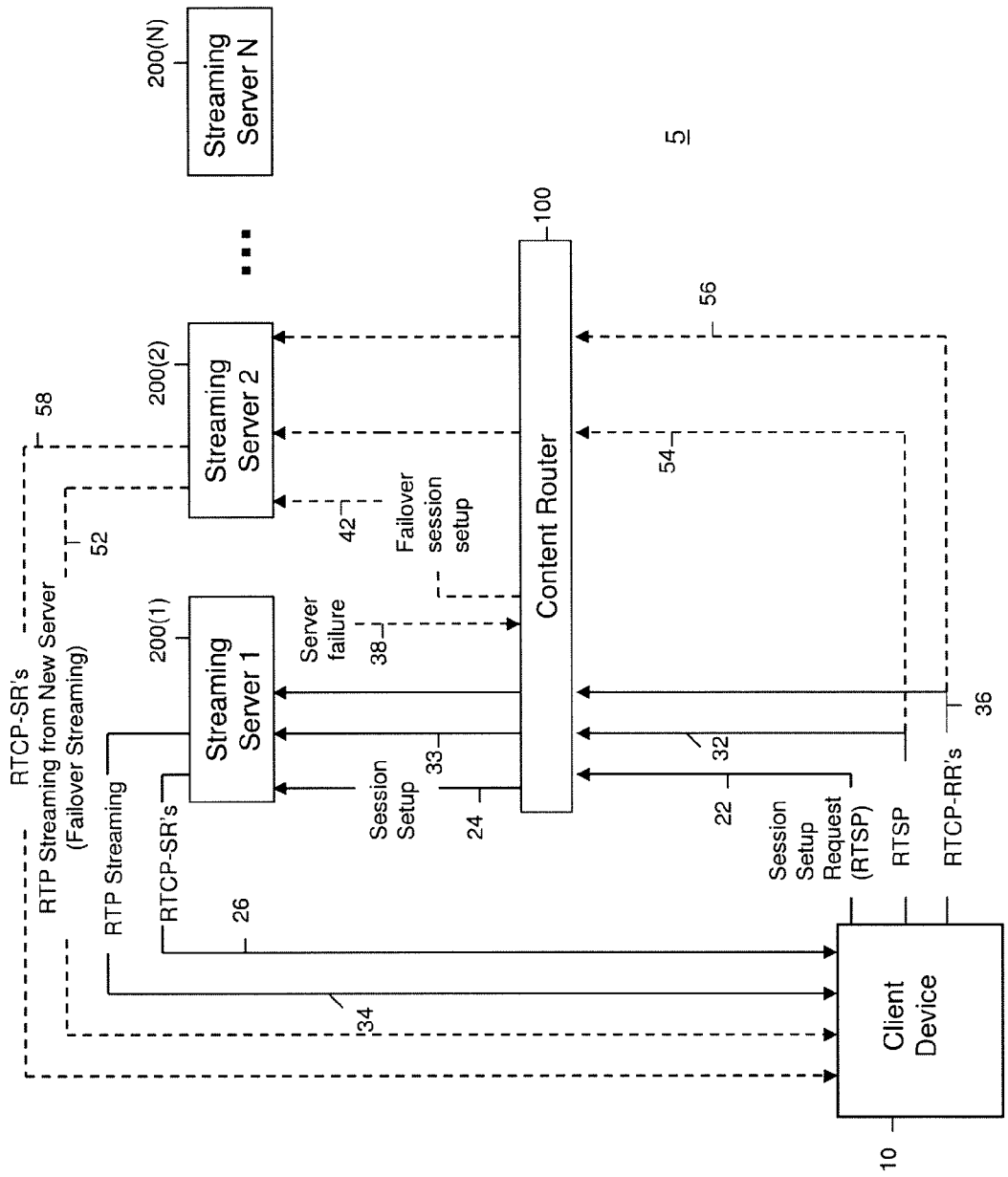
FIG. 1 is a block diagram of a content distribution system comprising a content router and a plurality of streaming servers that are configured to perform failover streaming in a manner that is transparent to a client device.

Referring first to FIG. 1, a content delivery network (CDN) 5 is shown comprising at least one client device 10, a content router device 100 and a plurality of streaming servers 200(1)-200(N). Each of the streaming servers 200(1)-200(N) is capable of transmitting a stream of data that is associated with content requested by the client device 10. The CDN 5 may be designed to distribute Internet Protocol Television (IPTV) services and the content may comprise video (with audio), audio, games, etc. Two or more (or all) of the streaming servers 200(1)-200(N) have access to the same content so that two or more of the streaming servers 200(1)-200(N) can serve a given stream of data to the client device 10. While a single client device 10 is shown in FIG. 1, this is meant to be for simplicity purposes and one with ordinary skill in the art will appreciate that there are numerous client devices served by the streaming servers 200(1)-200(N).

Each streaming server 200(1)-200(N) is configured to transmit a Real-Time Transport Protocol (RTP) stream containing content requested or desired by a client device (e.g., client device 10) and in so doing use the RTP Control Protocol (RTCP) for out-of-band control information for an RTP stream or flow. The RTCP messaging techniques are used periodically to transmit control packets to participants (streaming server or client device) in a streaming multimedia session. One function of the RTCP messaging techniques is to provide feedback on the quality of service associated with an RTP stream. In addition, the streaming servers 200(1)-200(N) may be configured to use the Real Time Streaming Protocol (RTSP), which allows a client device to remotely control a streaming media server, issuing VCR-like commands such as "play" and "pause", and allow time-based access to files on a streaming server. The sending of streaming data itself is not part of the RTSP protocol. Many streaming servers use the standards-based RTP as the streaming protocol for the actual audio/video data. The interplay of RTCP messages and RTSP messages in connection with the failover mechanisms described herein will become more apparent from the following description.

According to the techniques described herein, a controlling apparatus is configured to keep track of all the streaming servers 200(1)-200(N) and ongoing streaming sessions. The content router device 100 is well suited for this role. The content router device 100 is configured to serve as a "front-end" for the CDN 5 to the client devices, and be further configured to include proxy functionality for RTSP messages as well as RTCP feedback messages from the client device 30. Unlike "normal" RTSP proxies, the content router device 100 is configured not to proxy the RTP streams. Without the burden of proxying the RTP packet streams, the content router device 100 can scale to provide failover management by proxying RTCP feedback from client devices and thereby "route" the RTCP feedback to the new streaming server when failover occurs. When failover is required, the content router device 100 provides state information on all the sessions that were ongoing on the failed server to the newly assigned server(s). The content router device 30 is configured to monitor the ongoing sessions and compute estimates of the state information for each session.

The transparent failover schemes described herein can be achieved purely by using layer 7 networking techniques in the content router device 100. Only minimal changes are required within the streaming servers to support these schemes, and no changes are required on the client device.

Figure 2:
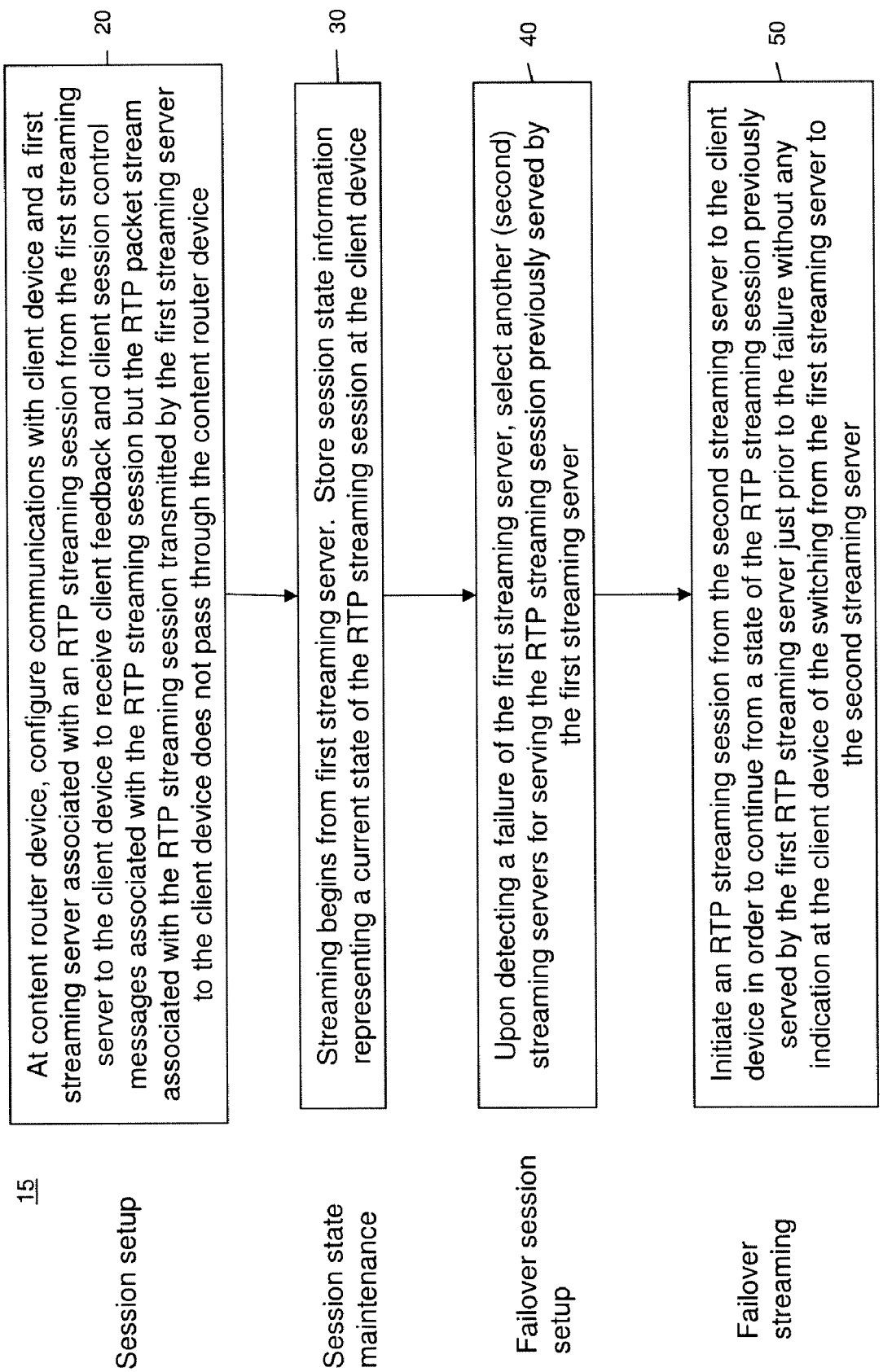
FIG. 2 is a flow chart generally depicting a failover streaming process.

Turning to FIG. 2 with continued reference to FIG. 1, a flow chart that generally depicts the failover process 15 is now described. There are several phases or stages of the process 15. The first stage is session setup for an RTP streaming session and is shown at 20. Session setup occurs when a client device requests content and in so doing issues a session setup request shown at 22 in FIG. 2. The content router device 100 receives the session setup request message from the client device 10 and selects one of the streaming servers 200(1)-200(N), e.g., streaming server 200(1), to serve the requested stream to the client device 10. Some session setup functions are performed, the details of which are described hereinafter. Generally, in the course of session setup, the content router device 100 configures communications with the client device 10 and the serving streaming server, e.g., streaming server 200(1), associated with the RTSP streaming session to the client device so that the content router device 100 receives client session feedback messages (e.g., RTCP-RR feedback messages) and client session control messages (e.g., RTSP messages) associated with the RTP streaming session, but in such a manner that the RTP packet stream associated with the RTP streaming session transmitted by the streaming server 200(1) to the client device does not pass through the content router device 100. The messaging between the client router device 100 and the streaming server 200(1) during session setup is shown at reference numeral 24 in FIG. 1.

The streaming server 200(1) transmits RTCP-server report (RTCP-SR) messages to the client device 10 shown at reference numeral 26 in FIG. 1 after streaming begins.

The next stage is at 30 when streaming begins from the streaming server 200(1). AT 30, the content router device 30 is configured to monitor the ongoing sessions and compute estimates of the state information for each session.

Streaming may actually begin when a user at the client device selects a "play" or other similar function resulting in a RTSP message (control message) being sent at reference numeral 32 in FIG. 1, to the content router device 100, which in turn forwards the RTSP message to the streaming server 200(1) at 33 to start streaming as shown at reference numeral 34. When the streaming session begins and thereafter during the streaming session, the content router device 100 computes and stores session state information representing a current state of the streaming session at the client device 10. Thus, the content router device 100 continues to receive RTSP messages from the client device 10 representing other functions, such as "stop", "pause", "fast forward", "rewind", etc., and uses knowledge of these user requests made at the client device 10 to update the session state information for the streaming session. In addition, while the streaming session is ongoing, content router device 100 receives RTCP-RR feedback messages from the client device 10 as shown at reference numeral 36. RTCP-RR messages from the client device 100 are examples of client session feedback messages referred to herein and RTSP messages from the client are examples of client session control messages referred to herein.

Failure of the streaming server 200(1) is shown to occur at reference numeral 38. The content router device 100 may detect failure of the streaming server from RTCP-RR feedback messages received from the client device 10. For example, the RTCP-RR feedback messages may include data indicating that streaming of packets to the client device for a streaming session has stopped from the streaming server 200 (1). Another mechanism involves each streaming server sending periodic "heartbeat" messages to the content router 100 indicating that it is "alive" and operating. When heartbeat messages are not received from a streaming server for a configured period of time, the content router 100 assumes that the streaming server has failed.

After the content router device 100 detects failure of the streaming server 200(1), the failover session setup stage shown at 40 begins. The content router device 100 selects another streaming server, e.g., streaming server 200(2) shown in FIG. 1, and transmits information as shown at reference numeral 42 to setup a streaming session from the new streaming server so that the new streaming server 200(2) serves the streaming session(s) previously served from the original streaming server, e.g., streaming server 200(1).

The functions or stages 20, 30 and 40 are performed primarily at the content router device 10.

Once session setup is made to the new streaming server, the next stage is at 50 and involves the new streaming server, e.g., streaming server 200(2), streaming to the client device 10, from a state of the streaming session previously served by the original streaming server, e.g., streaming server 200(1), just prior to the failure of the streaming server 200(1). Switching to the new streaming server 200(2) is done in a manner that is transparent to the client device 10, that is, without any indication at the client device of the failover switching from streaming server 200(1) to streaming server 200(2). Also, the switching is automatic in that it is triggered by the content router device 100 and does not require user initiation or involvement from the client device 10. Streaming from streaming server 200(2) is shown at reference numeral 52 in FIG. 1. The content router device 100 continues to receive and process (as explained in more detail hereinafter), any RTSP and RTCP-feedback messages from the client device 10 as shown at reference numerals 54 and 56 in FIG. 1. The streaming server 200(2) sends RTCP-SR messages to the client device 10 as shown at reference numeral 58 in FIG. 1.

Further details of the failover process 15 are described hereinafter.

Figure 3:
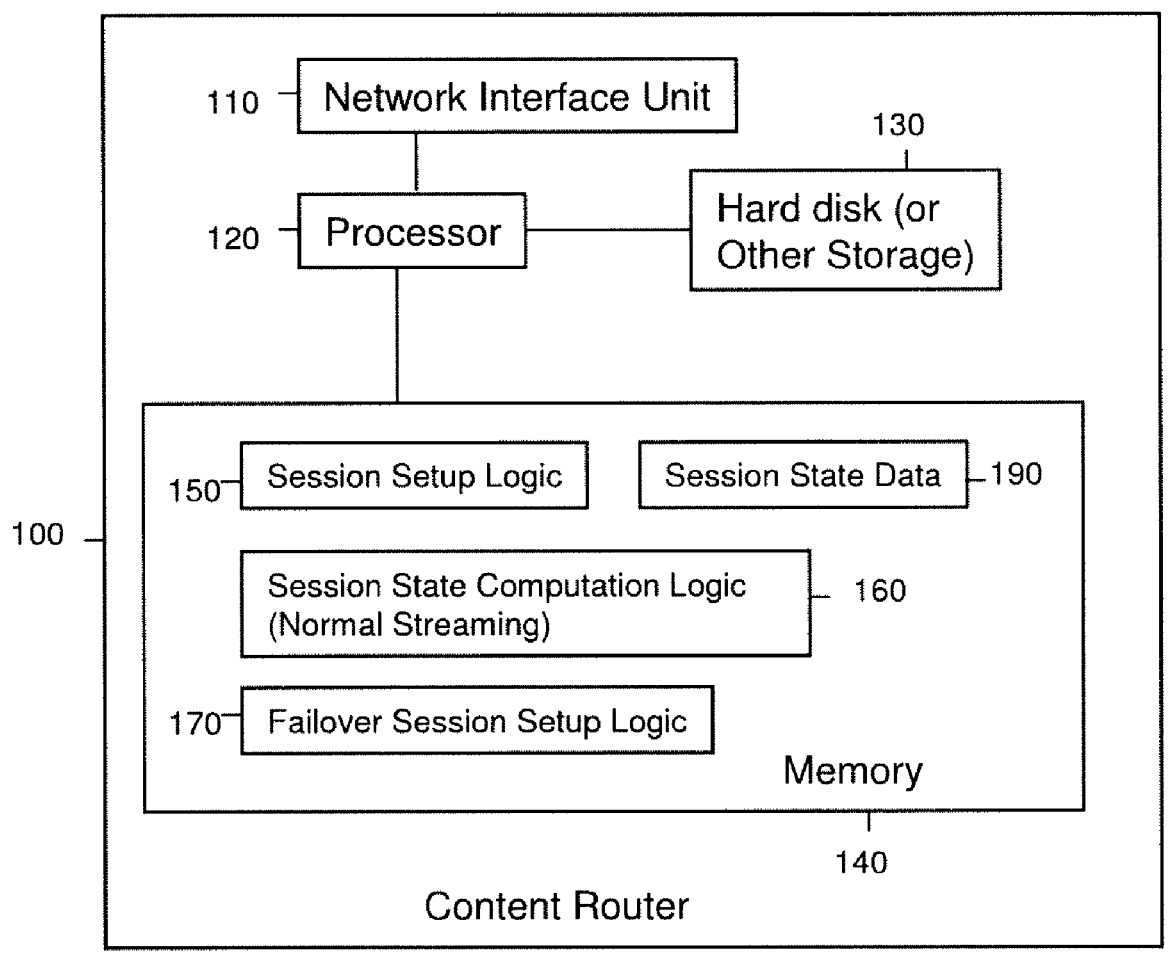
FIG. 3 is a block diagram of a content router device that is configured with logic to direct failover streaming from a failed streaming server to a newly assigned streaming server.

With reference now to FIG. 3, an example of a block diagram of the content router device 100 is described. The content router device 100 comprises a network interface unit 110, one or more data processors 120 and a hard disk (or other data storage) unit 130. The network interface unit 110 performs the network processing to enable the content router device 100 to receive and transmit messages via a network (such as a wide area network) to and from the streaming servers 200(1)-200(N) and to and from the client device 10. The particular type of network processing that the network interface unit 100 is configured to perform depends on the networking technology employed, and is not relevant for purposes of understanding the failover mechanisms described herein. The hard disk storage 130 is provided in order to store data that may be necessary for certain functions of the content router device 100.

The processor 120 is a microprocessor or other computer or data processor that is configured to perform various control functions for the content router device 100. To this end, instructions associated with logic for several failover management functions are stored in a computer or processor readable memory 140. The processor 120 is configured to execute the logic in order to perform these failover management functions, including session setup logic 150, session state computation logic 160 and failover session setup logic 170. In addition, the memory 140 stores in a database or table session state data 190 that is generated by the session setup logic 150 and the session state computation logic 160. Flow charts depicting examples of the session setup logic 150, session state computation logic 160, and failover session setup logic 170 are described hereinafter in conjunction with FIGS. 5, 6, and 7, respectively.

It should be apparent to one with ordinary skill in the art that the content router device 100 may comprise additional components that, for simplicity, are not shown in FIG. 3.

Figure 4:
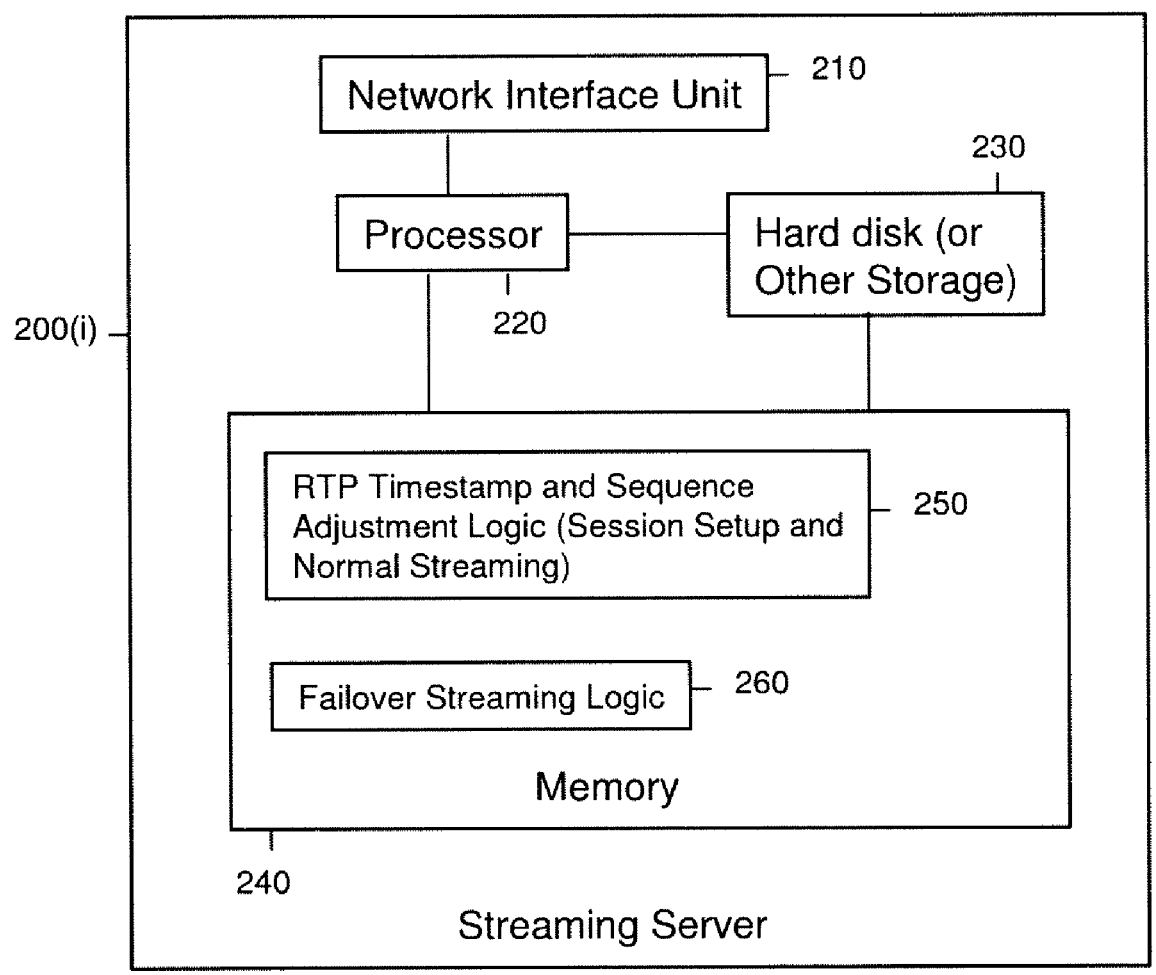
FIG. 4 is a block diagram of a streaming server that is configured with logic to perform failover streaming.

Turning now to FIG. 4, an example of a block diagram of a streaming server, generically identified at reference numeral 200(*i*), is now described. The streaming server 200(*i*) comprises a network interface unit 210, a processor 220 and a hard disk (or other data storage) unit 230. Since the streaming server 200(*i*) serves as a source of packets associated with RTP streams, the hard disk unit 230 serves as a data storage source for the data needed to generate and transmit the RTP streams. It is possible that the hard disk unit 230 may reside separately from the streaming server itself. The processor 220 is configured to execute instructions stored in a processor readable memory 240. To this end, there are instructions for RTP timestamp and sequence adjustment logic 250 and for failover streaming logic 260. These two pieces of logic represent the only minor modifications or changes that are needed to be made to an otherwise standard streaming server in order to configure the streaming server to be an operative part of the failover schemes described herein, whether as an original streaming server or as the "new" streaming server when the original streaming server fails. The RTP timestamp and sequence adjustment logic 250 and for failover streaming logic 260 are described in more detail hereinafter in conjunction with FIGS. 8 and 9, respectively.

The logic described herein for performing the functions of processes in the content router device 100 and streaming servers may be embodied by computer software instructions stored or encoded in a computer processor readable memory medium that, when executed by a computer processor, cause the computer processor to perform the process functions described herein. Alternatively, these processes may be embodied in appropriate configured digital logic gates, in programmable or fixed form, such as in an application specific integrated circuit with programmable and/or fixed logic. Thus, in general, these processes may be embodied in fixed or programmable logic, in hardware or computer software form.

Figure 5:
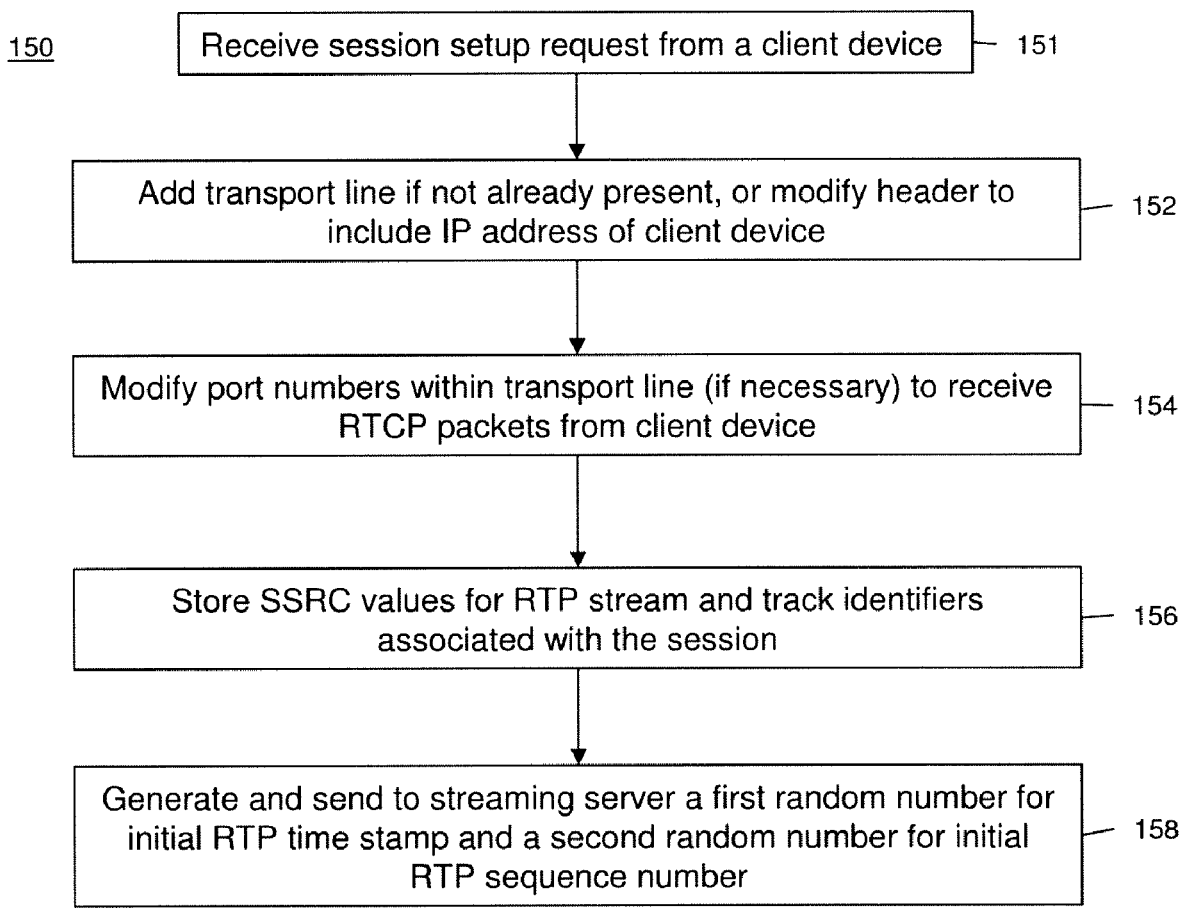
FIG. 5 is an example of a flow chart for session setup logic for a streaming session in the content router device.

Referring now to FIG. 5, the session setup logic 150 that is executed in the content router device 100 is described. During session setup, the content router device 100 is configured to act as an RTSP proxy with respect to RTSP (session control) messages generated by the client device 10. Session setup is initiated by a command received from the client device 10 at 151.

At 152, for each session setup request that the content router device 100 receives from the client device 10, the content router device 100 adds a transport line in the session setup request message, if not already present, or modifies a header of the session setup request message, to include the IP address of the client device 10. The content router device 100 forwards the session setup request message so modified to a selected one of the plurality of streaming servers, e.g., streaming server 200(1), to serve as the currently assigned (original) streaming server for the streaming session. For example, the content router device adds the following line to the session setup request packet:

Transport: destination=<IP address of the client>

If the Transport line is already present in the session setup request message, the header is merely modified to include the destination field. The header is untouched if the Transport line already specifies the IP address of the client device. Unlike normal RTSP proxies, the content router device 100 does not change the client port field because it has no interest in receiving RTP and RTCP packets from the streaming server that are intended for the client device 10. These actions will cause the streaming server, e.g., streaming server 200(1), that serves as the original streaming server for the requested streaming session, to send the RTP and RTCP messages directly to the client, but also causes the client device 10 to continue to send session control (e.g., RTSP) messages and session feedback (e.g., RTCP-RR) messages to the content router device 100, which processes them for relevant information for purposes of monitoring the state of the streaming session, and then forwards those messages to the currently assigned streaming server. Also at 152, the content router device stores in the session state data, the IP address and receiving RTP and RTCP port numbers of the client device 10.

At 154, for each setup message response that the content router device 100 receives from the streaming server handling the stream, the "server_Port" field within the Transport line is modified (if necessary) to ensure that the port numbers specified are actually available on the content router device 100. The content router device 100 uses these port numbers to receive RTCP messages from the client device. The original port numbers are stored in the session state data at the content router device 100. As a result, the content router device 100 can receive client feedback messages, e.g., RTCP feedback messages, from the client device 10 to be aware of the status of the streaming session with a streaming server (without actually receiving packets in the streaming session) and can forward these feedback messages to the streaming server that is currently serving the client device 10, which upon failure of one streaming server, can change to another streaming server.

At 156, the content router device 100 stores identification information associated with the streaming session. For example, the content router device 100 stores in the session state data the synchronization source (SSRC) identifier values and Track identifiers (trackIDs) for the stream contained in the setup responses received from the streaming server, and associates them with the session. The SSRC values are used to identify RTP streams, and the Track IDs are used to identify audio and video tracks carried by RTP streams.

At 158, the content router device 100 generates and sends to the streaming server that is to serve the streaming session, e.g., streaming server 200(1), a first random number for an initial RTP timestamp and a second random number for an initial RTP sequence number. The purpose of the function 158 is to generate an arbitrary reference from which the streaming session is started, and which is to be used if the original streaming server, e.g., streaming server 200(1), fails during a streaming session to the client device 10. The content router device 100 generates a first random number, for example, a 32-bit random number, stores it in the session state data, and sends it to the streaming server 200(1) to be used as the initial RTP timestamp. The content router device 100 also generates and stores a second random number, for example, a 16-bit random number, to be used as an initial RTP sequence number. The relaying of this random number information may be achieved by appending proprietary lines to a play request message from the client device 10 as the content router device 100 passes it to the streaming server 200(1). For example, the following lines may be appended to the header of a play request message:

x-initial-timestamp: <initial timestamp>
x-initial-sequence-number: <initial sequence number>

The manner in which the streaming server uses this random number information is described hereinafter in connection with FIG. 8.

Figure 6:
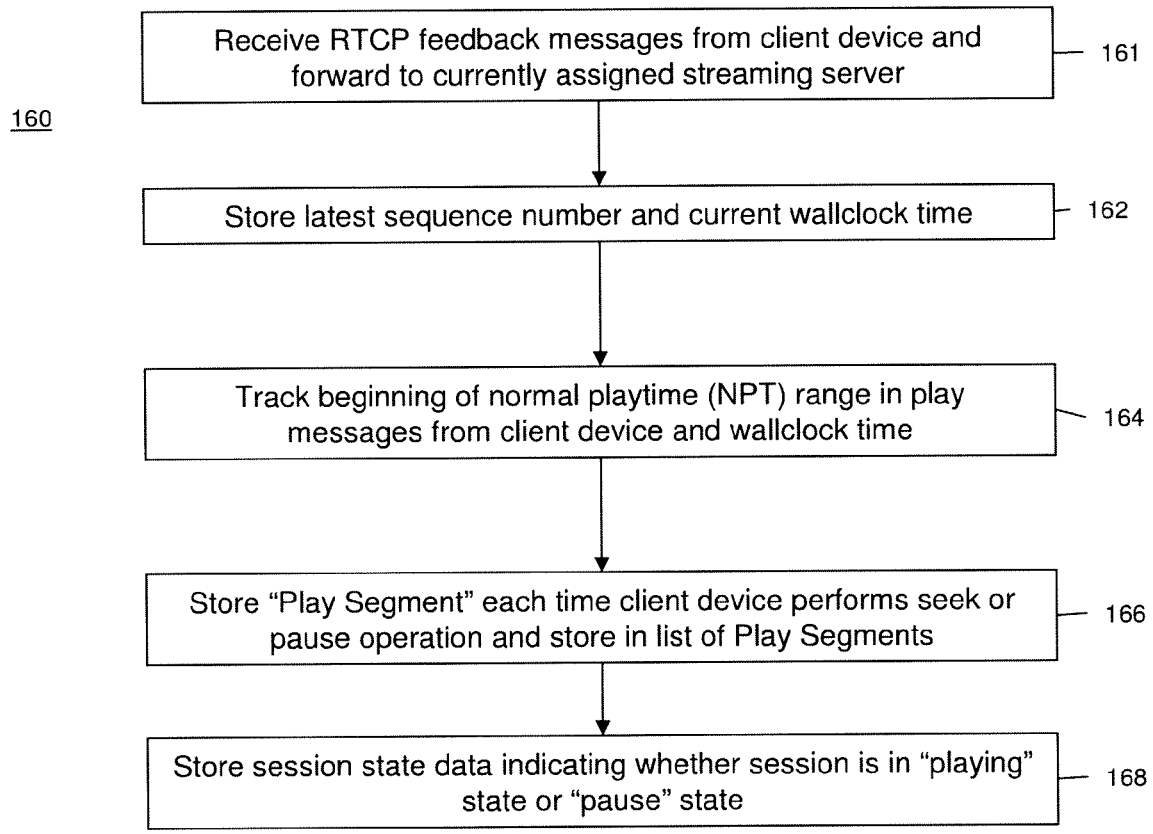
FIG. 6 is an example of a flow chart for session state computation logic in the content router device.

Turning now to FIG. 6, the session state computation logic 160 is now described. The session state computation logic 160 is executed by the content router device 100 while normal streaming is occurring from the original streaming server, e.g., streaming server 200(1), to the client device 10. Thus, at 161, the content router device 100 receives RTCP-RR feedback messages from the client device 100 and forwards them to the currently assigned streaming server, e.g., streaming server 200(1). The server port numbers stored at 154 (FIG. 5) are used as the destination ports for the RTCP feedback messages.

At 162, when the content router device 100 receives an RTCP-RR feedback message, it stores in the session state data a latest packet sequence number of the corresponding RTP stream (using the "extended highest sequence number received" field in the RTCP feedback message) along with the current "wallclock" time. The wallclock time is the time with respect to a local clock of the content router device 100. The "extended highest sequence number received" information indicates the latest RTP packet sequence number seen in the stream and is used hereinafter in the event of failure of the currently assigned streaming server. This function 162 is an optional function.

A user at the client device 10 may, from time to time, send commands to pause, fast forward, rewind, stop and play a given content stream. The content router device 100 is configured to keep track of these commands in order to maintain an estimate of the current state of the streaming session at any given time so that if and when the currently assigned streaming server fails, it can re-initiate the streaming session from a newly assigned streaming server from the streaming session state prior to the failure. Thus, at 164, the content router device keeps track (stores in the session state data) of the beginning of the normal playtime (NPT) range in RTSP play messages from the client device 10. The content router device 100 also records the wallclock time when play and pause messages from the client device 10 are received and proxied to the currently assigned streaming server. These values are used later for updated NPT computation.

In addition, as part of keeping track of session state data, at 166 the content router device 100 stores a list of "Play Segments". A Play Segment is defined as a range (A, B) where A is the beginning of the NPT range in a play message from a client device and B=A+wallclock time at the next pause message−wallclock time at the PLAY message. Each time the end-user at the client device 10 performs navigation commands (e.g., fast forward, rewind, pause, etc.), a new Play Segment is appended to the list and stored. This list of Play Segments is later used for estimating the RTP sequence number for the current state of the streaming session.

At 168, the content router device 100 stores in the session state data for the streaming session information indicating whether the session is in "playing" state or "paused" state. Thus, through the functions 161-168 shown in FIG. 6, the content router devices monitors the streaming session and derives data representing a current state of the streaming session at the client device 10 from the client session control and session feedback messages that the content router device 100 intercepts before they are directed to the currently assigned streaming server.

Figure 7:
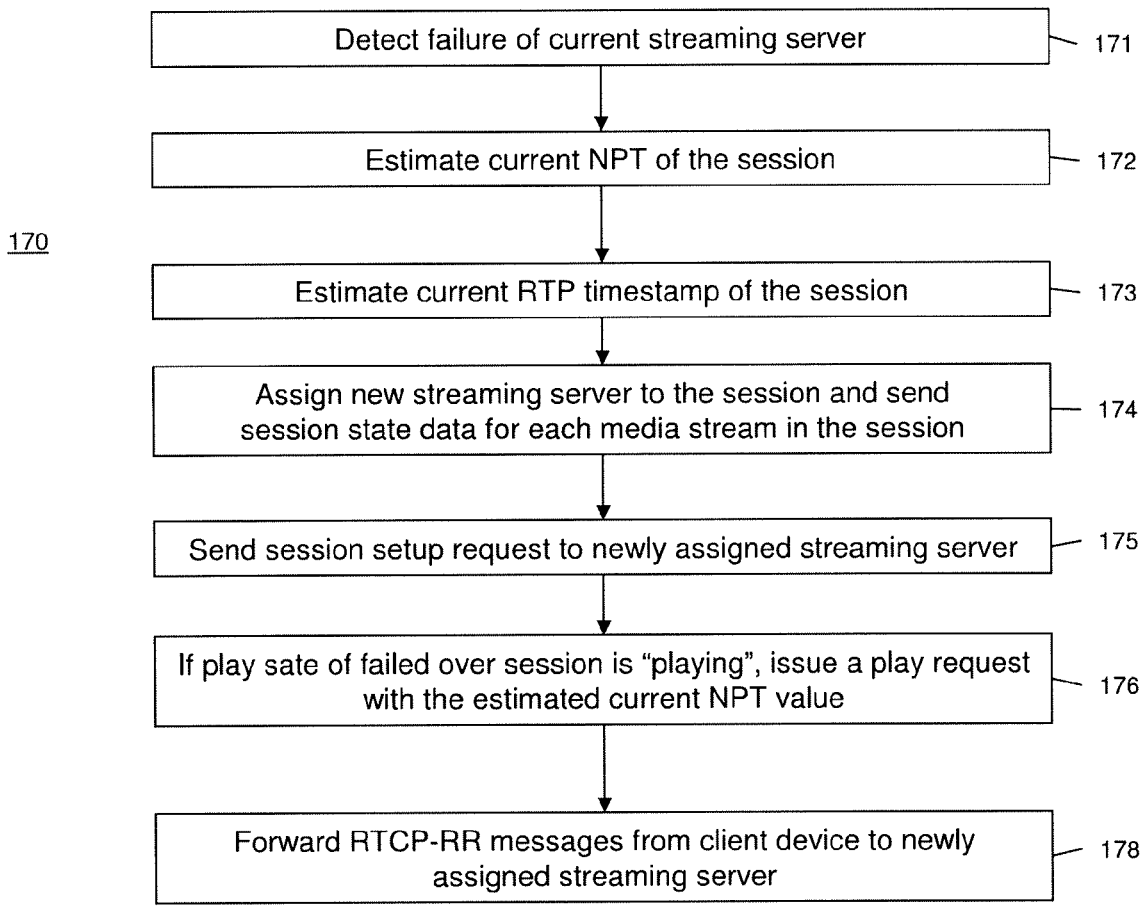
FIG. 7 is an example of a flow chart for failover session setup logic in the content router device.

Turning now to FIG. 7, the failover session setup logic 170 performed in the content router device 100 is now described. The logic 170 is initiated at 171 when the content router device 100 detects failure of the currently assigned (original) streaming server for a streaming session. In the example described herein, streaming server 200(1) is the currently assigned or original streaming server. There are many ways that the content router device 100 may detect failure of the streaming server, which are described in the foregoing in connection with FIG. 2.

Once the content router device 100 is aware of the failure of a streaming server, then at 172, the streaming server computes an estimate of the current NPT of the streaming session as follows.

If the session was in the "playing" state, then the content router device 100 computes the current NPT as equal to the beginning of the NPT range from the last play message from the client device+current wallclock time−wallclock time at the last play message from the client device.

If the session was in "paused" state, then the content router device 100 computes the current NPT as equal to the beginning of the NPT range from the last play message from the client device+wallclock time at the subsequent pause message from the client device−wallclock time at the last play message from the client device.

A newly assigned streaming server can use the current NPT value to determine which offset in the media file to start streaming from.

At 173, the content router device computes an estimate of the current RTP timestamp as follows:

Current RTP timestamp is equal to the initial RTP timestamp+((current wallclock time−wallclock time at the first play message from the client device)*RTP clock frequency). For example, the RTP clock frequency for an RTP stream is 90 kHz.

At 174, the content router device 100 selects or assigns a new streaming server to handle streaming of (the failed streaming) session(s) for the client device 10. In making this selection, the content router device 100 knows which of the other available streaming servers has access to the same content that was being streamed to the client device 10 by the original streaming server. In addition, the content router device 100 may also know the current load conditions of the candidate streaming servers and can select one of the candidate streaming servers that has capacity to handle the additional burden of the streaming session to the client device 10. Following the example that has been described herein, the content router device selects and assigns streaming server 200(2) to handle failover streaming to the client device 10. Also at 174, the content router device 100 sends the following session state information (including relative path of the media file associated with the failed session) to the newly assigned streaming server:

Track ID
SSRC
Current RTP timestamp
Initial RTP sequence number
Latest RTP sequence number
Time elapsed since the last RTCP-RR feedback message from the client device
List of Play Segments At 175, the content router device 100 generates and sends a session setup request to the newly assigned streaming server. This may be achieved by appending proprietary fields to the header of an RTSP setup request message. Within the setup request message, the destination IP address and client port numbers are set as per the values stored earlier at 152 in FIG. 5 by the content router device 100, thereby ensuring that the client device 10 continues to send session control and session feedback messages to the content router device 100 (which processes them for relevant information and forwards them to the newly assigned streaming server), but without receiving the RTP packet stream or any messages from the streaming server that are intended for the client device 10.

At 176, if the state of the failed streaming session is "playing", then the content router device 100 generates and sends to the streaming server a play request message containing the NPT value computed at 172.

At 178, the content router device 100 forwards RTCP-RR feedback messages from the client device 10 to the newly assigned streaming server, e.g., streaming server 200(2). The server ports obtained from the setup transaction at 175 are used as the destination ports.

Turning now to FIG. 8, the RTP timestamp and sequence adjustment logic 250 in a streaming server 200(i) is now described. The logic 250 is provided in any streaming server that is to be configured to participate in the failover streaming schemes described herein. Moreover, the logic 250 is executed by a streaming server in response to initial setup of a streaming session via the content router device 100 and at 252 is responsive to, and begins, upon receiving the first random number to be used as the initial RTP timestamp and the second random number to be used as the RTP sequence number. The streaming server receives these random numbers in a message from the content router device 100 per the function 158 in the session setup logic 150 of the content router device described above in conjunction with FIG. 5. At 254, the streaming server begins streaming to the client device using the first random number as the initial RTP timestamp and the second random number as the initial RTP sequence number, again, where these random numbers are used as an arbitrary reference point known to the content router device 100 for the streaming session.

Figure 9:
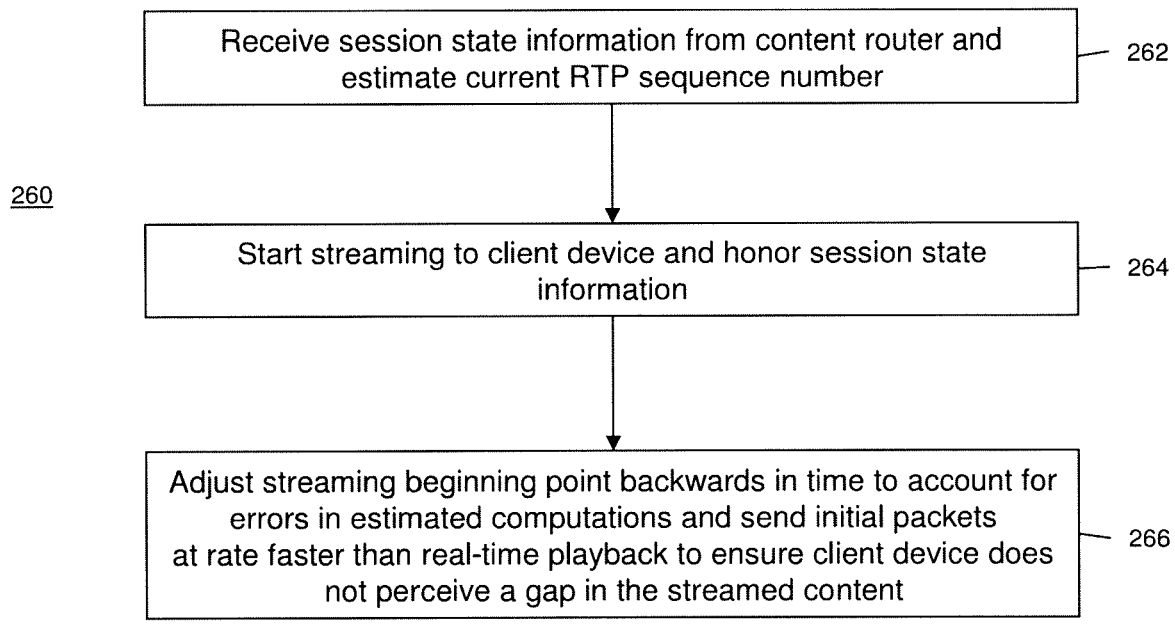
FIG. 9 is an example of a flow chart for failover streaming logic in a streaming server.

Referring to FIG. 9, the failover streaming logic 260 in a streaming server 200(i) is now described. Like logic 250, the failover streaming logic 260 is provided in any streaming server that is to be configured to participate in the failover streaming schemes described herein. At 262, the newly assigned streaming server receives the session state information from the content router device 100 and computes an estimate of the current RTP sequence number as follows:

Current RTP sequence number is equal to initial RTP sequence number+Number of RTP packets in each Play Segment.

Number of RTP packets in Play Segment (A, B) is equal to a Zero-based RTP sequence number at NPT B−Zero-based RTP sequence number at NPT A.

The Zero-based RTP sequence number corresponding to a specific NPT can be obtained from a RTP "hint" track within the media file. In the absence of hint tracks in the media file, a heuristic based on the latest RTP sequence number (obtained by the content router device from RTCP-RR feedback messages from the client device), time elapsed since the last RTCP-RR feedback message and the bit rate of the media stream may be used. If such a heuristic used, a "higher guess" may be employed. (A lower guess would result in the client RTP layer dropping packets because they would be considered as duplicates.)

At 264, the newly assigned streaming server starts streaming while honoring all the state information supplied to it up to this point in time.

At 266, the newly assigned streaming server may adjust the streaming begin point backwards in time to account for errors in estimated computations and send initial packets at a rate faster than real-time playout to ensure that the client device 10 does not perceive a gap in the streamed content. For example, errors resulting from rounding, etc., are mitigated by "backing-up" the streaming start point from the current offset and sending a few packets during an initial period of time at a rate that is faster than real-time playout rate at the client device. This may result in overlapping media data at the client device 10, but the RTP layer at the client device 10 will filter out (discard) the overlap according to the RTP timestamps.

The failover streaming schemes described above involve a sequence of actions performed partly at the content router device 100 and partly at the streaming servers which result in a transparent failover of the RTSP/RTP sessions.

There are numerous advantages to the failover streaming schemes described herein. First, no changes to the hardware or software are needed at the client devices. There is also no need for the end-user at a client device to re-initiate a session. The session is automatically re-initiated by the content router device 100 to a newly assigned streaming server. This makes for a nearly glitch-free failover from the end-user's perspective.

Furthermore, better resource utilization is achieved. The streaming servers need not be paired statically for failover. Rather, a backup streaming server is assigned dynamically based on the characteristics such as current load conditions, service availability, etc. This is possible because the content router device 100 has available to it load and other status information of all streaming servers in the distribution network. In addition, the failover schemes described herein do not place the burden on the streaming server to maintain session state information for individual streaming sessions that it is serving. This is particularly important because when a streaming server fails, even if it had the session state information available, it may not be capable of providing it to another device or entity. There is also no need for the content router device to monitor all the RTP packets in all of the streaming sessions that a streaming server is serving. Once failover switching to the newly assigned streaming server occurs, the content router device 100, by configuring communications with the client device to server as a proxy for client session control and client session feedback messages, the content router device 100 can ensure that the client's messages will get re-directed to the newly assigned streaming server and no longer go to the failed streaming server.

While the foregoing describes that upon failover, the streaming sessions from the failed streaming server are switched to one streaming server, it is also possible that streaming sessions are switched to multiple streaming servers so as to distribute the load from the failed streaming server among multiple streaming servers. Thus, the content router is configured to store session state information for each of a plurality of streaming sessions served by a first streaming server, to select each of a plurality of other streaming servers to handle one or more of the plurality of streaming sessions served by the first streaming server when the first streaming server is determined to have failed, and to initiate streaming sessions from each of the plurality of other streaming servers that have been selected to handle corresponding ones of the plurality of streaming sessions previously served by the first streaming server.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   at a first device that is configured to interface with a plurality of streaming servers for real-time protocol packet streams, configuring communications with a client device and a first of the plurality of streaming servers associated with a streaming session from the first streaming server to the client device so that the first device receives client session control and session feedback messages associated with the streaming session and so that a packet stream associated with the streaming session transmitted by the first streaming server to the client device does not pass through the first device;
   storing at the first device session state information comprising an address of the client device, streaming session identification information and data representing a current state of the streaming session at the client device derived from the client session control and session feedback messages;
   upon detecting a failure of the first streaming server, selecting a second of the plurality of streaming servers for serving the streaming session previously served by the first streaming server; and
   initiating a streaming session from the second streaming server to the client device in order to continue from a state of the streaming session previously served by the first streaming server prior to the failure without any indication at the client device of the switching from the first streaming server to the second streaming server.

2. The method of claim 1, wherein configuring comprises configuring a session setup request message received from the client device to be forwarded to the first streaming server so that the client session feedback and session control messages from the client device are directed to the first device.

3. The method of claim 2, and further comprising storing a latest packet sequence number contained in a session feedback message received from a client device for the streaming session and a current time with respect to a clock of the first device.

4. The method of claim 2, wherein storing session state information comprises storing data indicating whether a current state of the streaming session is a play state or a pause state, and storing data associated with each of one or more play segments for the streaming session, wherein play segment data is generated at the first device in response to navigation commands made at the client device for the streaming session.

5. The method of claim 4, wherein storing comprises storing play segment data for each play segment, wherein the play segment data defines a range (A, B) where A is the beginning of the normal playtime range in a play request message from the client device and B is equal to A plus a time with respect to a clock of the first device at a next pause message minus a time with respect to the clock of the first device of the play request message.

6. The method of claim 5, wherein configuring comprises generating at the first device for sending to the first streaming server, a first random number to be used as an initial Real-Time Transport Protocol (RTP) timestamp and a second random number to be used as an initial RTP sequence number, which first and second random numbers serve as an arbitrary reference point for the streaming session when the first streaming server starts the streaming session to the client device.

7. The method of claim 6, wherein at the first streaming server, beginning the streaming session to the client device using the first random number as the initial RTP timestamp for the streaming session and the second random number as the initial RTP sequence number.

8. The method of claim 7, wherein upon detecting failure of the first streaming server, further comprising at the first device computing a current normal playback time of the streaming session based on whether the streaming session was in a play state or a pause state at the time of the failure of the first streaming server.

9. The method of claim 8, wherein computing further comprises computing a current RTP timestamp for the streaming session based on the first random number for the initial RTP timestamp, a current time with respect to a clock of the first device, a time of a first play request message from the client device for the streaming session and a clock frequency associated with RTP packets in the streaming session.

10. The method of claim 9, and further comprising forwarding to the second streaming server the session state information comprising the current RTP timestamp, the initial RTP sequence number and time elapsed since a latest session feedback message from the client device.

11. The method of claim 10, wherein initiating comprises transmitting a play request message from the first device to the second streaming server when the session state information indicates that a state of the streaming session at the time of failure of the first streaming server was a play state.

12. The method of claim 11, and further comprising at the second streaming server, computing a current RTP sequence number for the streaming session from the initial RTP sequence number plus the number of RTP packets in each play segment.

13. The method of claim 12, and further comprising at the second streaming server, adjusting a point from which streaming starts from the second streaming server to the client device and transmitting packets from the second streaming server to the client device for an initial period of time at a rate faster than a real-time playout rate.

14. The method of claim 1, wherein storing at the first device comprises storing session state information for each of a plurality of streaming sessions served by the first streaming server, and wherein selecting comprises selecting each of a plurality of other streaming servers to handle one or more of the plurality of streaming sessions served by the first streaming server when the first streaming server is determined to have failed, and wherein initiating comprises initiating streaming sessions from each of the plurality of other streaming servers that have been selected to handle corresponding ones of the plurality of streaming sessions previously served by the first streaming server.

15. An apparatus comprising:
    a network interface unit that is configured to interface over a network with a plurality of streaming servers of real-time packet streams;
    a processor configured to connect to the network interface unit, wherein the processor is configured to:
       configure communications with a client device and a first of the plurality of streaming servers associated with a streaming session from the first streaming server to the client device in order to receive client session control and session feedback messages associated with the streaming session but without receiving a packet stream associated with the streaming session transmitted by the first streaming server to the client device;

store session state information comprising an address of the client device, streaming session identification information derived from the client control messages and data representing a current state of the streaming session at the client device derived from the client session control and session feedback messages received from the client device;

upon detecting a failure of the first streaming server, select a second of the plurality of streaming servers for serving the streaming session previously served by the first streaming server; and initiate a streaming session from the second streaming server to the client device in order to continue from a state of the streaming session previously served by the first streaming server prior to the failure without any indication at the client device of the failover switching from the first streaming server to the second streaming server.

16. The apparatus of claim 15, wherein the processor configures communications by configuring a session setup request message received from the client device to be forwarded to the first streaming server in order to receive the session feedback and session control messages from the client device.

17. The apparatus of claim 16, wherein the processor is further configured to generate a first random number to be used as an initial Real-Time Transport Protocol (RTP) timestamp and a second random number to be used as an initial RTP sequence number, which together serve as an arbitrary reference point for the streaming session, and the processor is further configured to transmit the first random number and the second random number to the first streaming server when starting the streaming session from the first streaming server to the client device.

18. The apparatus of claim 17, wherein the processor is configured to store session state information comprising data indicating whether a current state of the streaming session is a play state or a pause state, and to generate and store play segment data in response to navigation commands made at the client device for the streaming session data associated with each of one or more play segments for the streaming session.

19. The apparatus of claim 18, wherein the processor is configured to generate and store play segment data for each play segment, wherein the play segment data defines a range (A, B) where A is the beginning of the normal playtime range in a play request message from the client device and B is equal to A plus a time with respect to a local clock at a next pause message minus a time with respect to the local clock of the first device of the play request message.

20. The apparatus of claim 19, wherein the processor is configured to, upon detecting failure of the first streaming server, compute a current normal playback time of the streaming session based on whether the streaming session was in a play state or a pause state at the time of the failure of the first streaming server.

21. The apparatus of claim 20, wherein the processor is further configured to compute a current RTP timestamp for the streaming session based on the first random number for the initial RTP timestamp, a current time with respect to a local clock, a time of a first play request message from the client device for the streaming session and a clock frequency associated with RTP packets in the streaming session.

22. The apparatus of claim 21, wherein the processor is configured to initiate the streaming session at the second streaming server by transmitting to the second streaming server the session state information comprising the current RTP timestamp, the initial RTP sequence number and time elapsed since a latest session feedback message from the client device.

23. The apparatus of claim 21, wherein the processor is further configured to transmit a play request message to the second streaming server when the session state information indicates that a state of the streaming session at the time of failure of the first streaming server was a play state.

24. Logic encoded in one or more storage media device for execution and when executed operable to:

configure communications with a client device and a first of a plurality of streaming servers associated with a streaming session from the first streaming server to the client device in order to receive client session control and session feedback messages associated with the streaming session but without receiving a packet stream associated with the streaming session transmitted by the first streaming server to the client device;

store session state information comprising an address of the client device, streaming session identification information and data representing a current state of the streaming session at the client device derived from the client session control and session feedback messages;

upon detecting a failure of the first streaming server, select a second of the plurality of streaming servers for serving the streaming session previously served by the first streaming server; and initiate a streaming session from the second streaming server to the client device in order to continue from a state of the streaming session previously served by the first streaming server prior to the failure without any indication at the client device of the failover switching from the first streaming server to the second streaming server.

25. The logic of claim 24, wherein the logic that configures communications comprises logic that configures a session setup request message received from the client device to be forwarded to the first streaming server in order to receive the session feedback and session control messages from the client device.

26. The logic of claim 25, and further comprising logic that generates a first random number to be used as an initial RTP timestamp and a second random number to be used as an initial RTP sequence number, which together serve as an arbitrary reference point for the streaming session, and the processor is further configured to transmit the first random number and the second random number to the first streaming server when starting the streaming session from the first streaming server to the client device.

27. The logic of claim 26, wherein the logic that stores session state information comprises logic that stores data indicating whether a current state of the streaming session is a play state or a pause state, and to generate and store play segment data in response to navigation commands made at the client device for the streaming session data associated with each of one or more play segments for the streaming session.

28. The logic of claim 27, and further comprising logic that, upon failure of the first streaming server, computes a current normal playback time of the streaming session based on whether the streaming session was in a play state or a pause state at the time of the failure of the first streaming server.

* * * * *